(12) United States Patent
Singh et al.

(10) Patent No.: US 8,391,195 B1
(45) Date of Patent: Mar. 5, 2013

(54) ASSISTED TRANSPORT OF COMMUNICATIONS FOR WIRELESS COMMUNICATION DEVICES

(75) Inventors: Jasinder Pal Singh, Olathe, KS (US); Sachin R. Vargantwar, Overland Park, KS (US); Bhagwan Singh Khanka, Lenexa, KS (US); Manoj Shetty, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 310 days.

(21) Appl. No.: 12/861,277

(22) Filed: Aug. 23, 2010

(51) Int. Cl.
*H04B 7/00* (2006.01)

(52) U.S. Cl. ........................................................ 370/310

(58) Field of Classification Search .................. 370/310, 370/315–327, 329, 340–345; 455/7, 17, 455/20
See application file for complete search history.

(56) References Cited

U.S. PATENT DOCUMENTS

| | | | | |
|---|---|---|---|---|
| 6,088,592 A | * | 7/2000 | Doner et al. | 455/447 |
| 6,404,775 B1 | * | 6/2002 | Leslie et al. | 370/466 |
| 6,697,603 B1 | * | 2/2004 | Lovinggood et al. | 455/13.1 |
| 7,676,194 B2 | * | 3/2010 | Rappaport | 455/11.1 |
| 8,089,913 B2 | * | 1/2012 | Proctor et al. | 370/315 |
| 2005/0130588 A1 | | 6/2005 | Pratt et al. | |
| 2006/0063484 A1 | * | 3/2006 | Proctor et al. | 455/7 |
| 2006/0203757 A1 | * | 9/2006 | Young et al. | 370/315 |
| 2008/0132164 A1 | | 6/2008 | Bugenhagen et al. | |
| 2010/0074162 A1 | * | 3/2010 | Koh et al. | 370/315 |

\* cited by examiner

*Primary Examiner* — Dmitry H Levitan

(57) ABSTRACT

What is disclosed is a method of operating a wireless communication device. The method includes establishing an assisted wireless link between the wireless communication device and an assisted wireless communication device, where the assisted wireless link comprises a first wireless communication mode that requires tuning to a first frequency spectrum, and establishing a transport wireless link between the wireless communication device and a wireless access node, where the transport wireless link comprises a second wireless communication mode that requires tuning to a second frequency spectrum. The method includes receiving forward communications for the assisted wireless communication device from the wireless access node over the transport wireless link, transferring the forward communications over the assisted wireless link for receipt by the assisted wireless communication device, receiving reverse communications transferred by the assisted wireless communication device over the assisted wireless link, and transferring the reverse communications for receipt by the wireless access node over the transport wireless link.

16 Claims, 5 Drawing Sheets

ASSISTED TRANSPORT OF COMMUNICATIONS FOR WIRELESS COMMUNICATION DEVICES

TECHNICAL FIELD

Aspects of the disclosure are related to the field of communications, and in particular, wireless communications of wireless communication devices in wireless communication networks.

TECHNICAL BACKGROUND

Wireless communication networks typically include wireless access nodes distributed over a geographic area, through which wireless communication devices can register and provide wireless access to communication services. The wireless communication devices receive wireless access from the wireless access nodes, such as base stations, where the wireless access nodes and the wireless communication devices exchange communications over wireless links. In many examples, the wireless communication devices are mobile devices, and can move between wireless coverage areas of the wireless access nodes, as well as move within the coverage area of a particular wireless access node.

These wireless links can experience degradation based upon signal conditions, distance to the wireless access nodes, among other factors. For example, when a wireless communication device is a mobile device and is moved into a building, signal quality can degrade and cause a loss of wireless service for the wireless communication device. However, other nearby wireless communication devices may have sufficient signal quality and be able to establish wireless service with a wireless access node.

Overview

What is disclosed is a method of operating a wireless communication device. The method includes establishing an assisted wireless link between the wireless communication device and an assisted wireless communication device, where the assisted wireless link comprises a first wireless communication mode that requires tuning to a first frequency spectrum, and establishing a transport wireless link between the wireless communication device and a wireless access node, where the transport wireless link comprises a second wireless communication mode that requires tuning to a second frequency spectrum. The method includes receiving forward communications for the assisted wireless communication device from the wireless access node over the transport wireless link, transferring the forward communications over the assisted wireless link for receipt by the assisted wireless communication device, receiving reverse communications transferred by the assisted wireless communication device over the assisted wireless link, and transferring the reverse communications for receipt by the wireless access node over the transport wireless link.

What is also disclosed is a wireless communication device. The wireless communication device includes a first transceiver configured to establish an assisted wireless link between the wireless communication device and an assisted wireless communication device, where the assisted wireless link comprises a first wireless communication mode that requires tuning to a first frequency spectrum. The wireless communication device also includes a second transceiver configured to establish a transport wireless link between the wireless communication device and a wireless access node, where the transport wireless link comprises a second wireless communication mode that requires tuning to a second frequency spectrum. The second transceiver is configured to receive forward communications for the assisted wireless communication device from the wireless access node over the transport wireless link. The first transceiver is configured to transfer the forward communications over the assisted wireless link for receipt by the assisted wireless communication device, and receive reverse communications transferred by the assisted wireless communication device over the assisted wireless link. The second transceiver is also configured to transfer the reverse communications for receipt by the wireless access node over the transport wireless link.

What is disclosed is a method of operating a wireless communication device. The method includes entering into a transport mode on the wireless communication device. In response to entering the transport mode, the method includes establishing an assisted wireless link between the wireless communication device and an assisted wireless communication device, where the assisted wireless link uses a first wireless communication protocol, and establishing a transport wireless link between the wireless communication device and a wireless access node, where the transport wireless link uses a second wireless communication protocol. The method also includes receiving forward communications for the assisted wireless communication device from the wireless access node over a forward link of the transport wireless link. The method also includes transferring the forward communications over a reverse link of the assisted wireless link for receipt by the assisted wireless communication device, where the reverse link of the assisted wireless link provides a forward wireless link for the assisted wireless communication device. The method also includes receiving reverse communications transferred by the assisted wireless communication device over a forward link of the assisted wireless link, where the forward link of the assisted wireless link provides a reverse wireless link for the assisted wireless communication device. The method also includes transferring the reverse communications for receipt by the wireless access node over a reverse link of the transport wireless link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
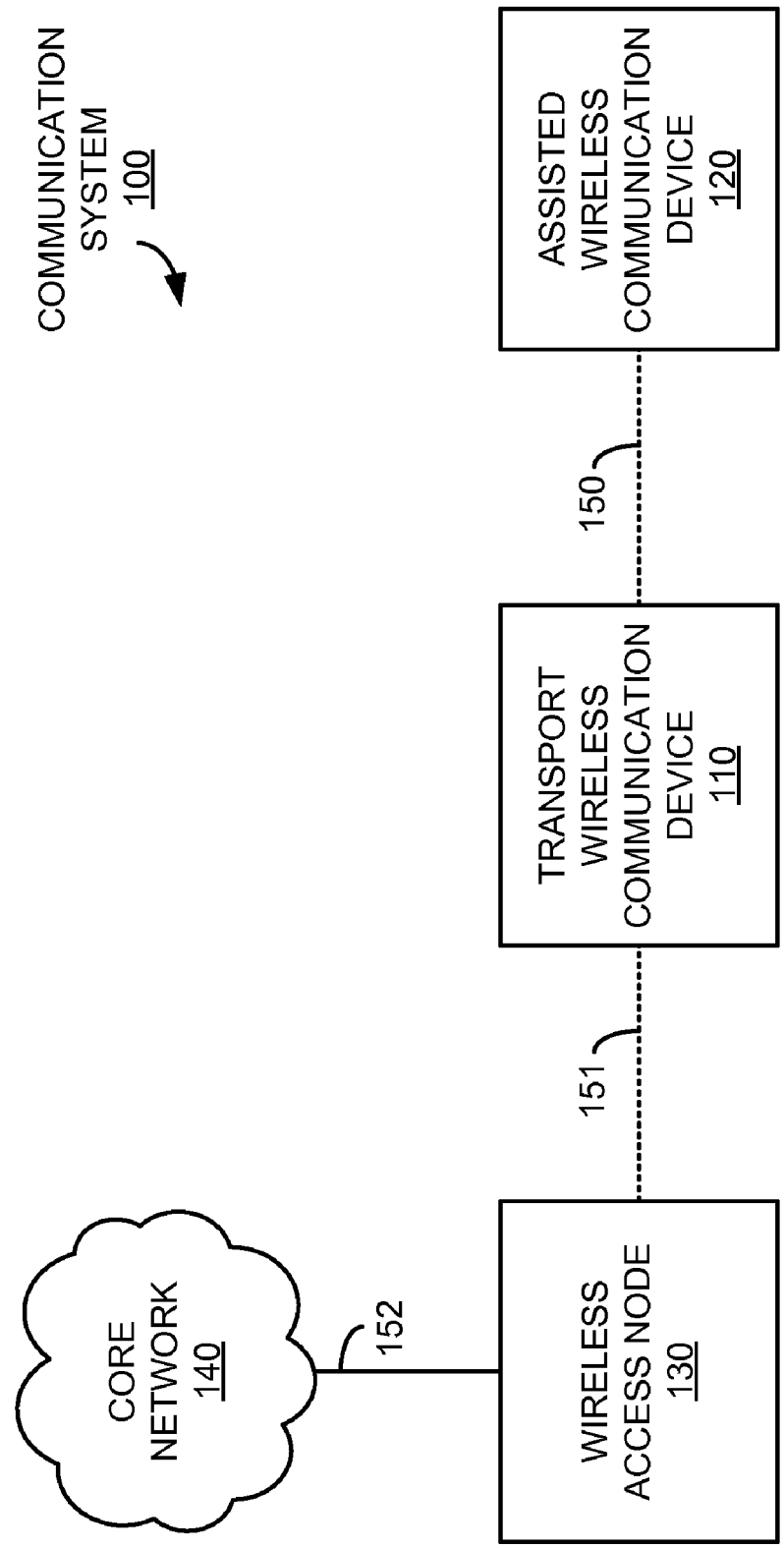
FIG. 1 is a system diagram illustrating a communication system.

FIG. 1 is a system diagram illustrating communication system 100. Communication system 100 includes transport wireless communication device 110, assisted wireless communication device 120, wireless access node 130, and core network 140. Transport wireless communication device 110 and assisted wireless communication device 120 communicate over wireless link 150. Transport wireless communication device 110 and wireless access node 130 communicate over wireless link 151. Wireless access node 130 and core network 140 communicate over link 152. In this example, wireless link 150 is referred to as an assisted wireless link, and wireless link 151 is referred to as a transport wireless link, although other designations could be used. In FIG. 1, although transport wireless communication device 110 and assisted wireless communication device 120 are capable of receiving wireless access to communication services from wireless access nodes, such as wireless access node 130, they are initially not registered for wireless access from wireless access node 130. In this example, the communication services could include services provided by core network 140 or other systems, such as voice calls, data exchange, Internet access, text messaging, among other services.

Figure 2:
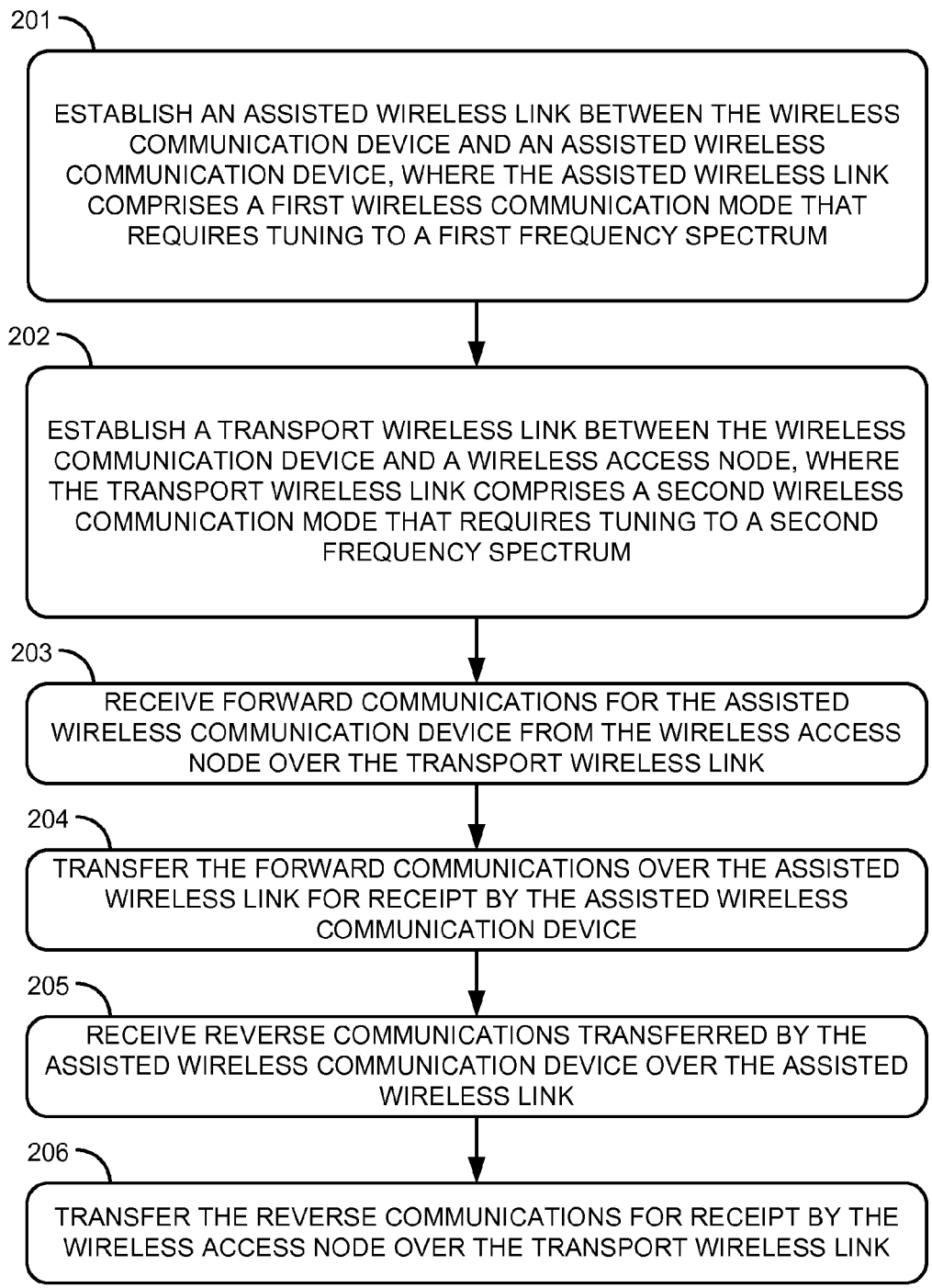
FIG. 2 is a flow diagram illustrating a method of operation of a wireless communication device.

FIG. 2 is a flow diagram illustrating a method of operation of a wireless communication device, such as transport wireless communication device 110 of FIG. 1. The operations of FIG. 2 are referenced herein parenthetically. In FIG. 2, transport wireless communication device 110 establishes (201) assisted wireless link 150 between transport wireless communication device 110 and assisted wireless communication device 120. Assisted wireless link 150 comprises a first wireless communication mode that requires tuning to a first frequency spectrum. For example, the first wireless communication mode could include a first wireless communication protocol, user communications frequency spectrum, or frequency band used for cellular communications. Both transport wireless communication device 110 and assisted wireless communication device 120 communicate using the first wireless communication mode over assisted wireless link 150. In some examples, assisted wireless link 150 is established by first exchanging overhead communications between transport wireless communication device 110 and assisted wireless communication device 120. These overhead communications could be exchanged over assisted wireless link 150, or over additional links, including combinations thereof.

Transport wireless communication device 110 establishes (202) transport wireless link 151 between transport wireless communication device 110 and wireless access node 130. Transport wireless link 151 comprises a second wireless communication mode that requires tuning to a second frequency spectrum. For example, the second wireless communication mode could include a second wireless communication protocol, user communications frequency spectrum, or frequency band used for cellular communications. Both transport wireless communication device 110 and wireless access node 130 communicate using the second wireless communication mode over transport wireless link 151. In some examples, transport wireless link 151 is established by first exchanging overhead communications between transport wireless communication device 110 and wireless access node 130. These overhead communications are exchanged over transport wireless link 151 in this example.

Transport wireless communication device 110 receives (203) forward communications for assisted wireless communication device 120 from wireless access node 130 over transport wireless link 151. The forward communications are communications transferred by wireless access node 130 for delivery to assisted wireless communication device 120. Transport wireless communication device 110 transfers (204) the forward communications over assisted wireless link 150 for receipt by assisted wireless communication device 120. Assisted wireless communication device 120 can then receive the forward communications over assisted wireless link 150.

In this example, the forward communications transferred for receipt by assisted wireless communication device 120 are received from wireless access node 130 over transport wireless link 151, and subsequently transferred over assisted wireless link 150. Also in this example, a different wireless communication mode is used to receive the forward communications over transport wireless link 151 as is used to transfer the forward communications over assisted wireless link 150. The forward communications as received by transport wireless communication device 110 over transport wireless link 151 may include user communication portions and overhead communication portions. Upon receipt of the forward communications in transport wireless communication device 110, the overhead communication portions could be separated from the user communication portions, and the user communication portions transferred over assisted wireless link 150. Additional overhead communication portions may also be included with the user communication portions of the forward communications transferred over assisted wireless link 150, such as overhead and control information used for the associated wireless communication mode. The overhead communication portions could include signaling, control information, headers, channelization information, among other information used for transporting information wirelessly according the associated wireless communication mode. The user communication portions could include voice communications, data communications, text messaging, email, Internet data, streaming data, among other user data.

Transport wireless communication device 110 receives (205) reverse communications transferred by assisted wireless communication device 120 over assisted wireless link 150. The reverse communications are communications transferred by assisted wireless communication device 120 for delivery to wireless access node 130. Transport wireless communication device 110 transfers (206) the reverse communications for receipt by wireless access node 130 over transport wireless link 151. Wireless access node 130 can then receive the reverse communications over transport wireless link 151.

In this example, the reverse communications transferred by assisted wireless communication device 120 are received from assisted wireless communication device 120 over assisted wireless link 150, and subsequently transferred over transport wireless link 151. Also in this example, a different wireless communication mode is used to receive the reverse communications over assisted wireless link 150 as is used to transfer the reverse communications over transport wireless link 151. The same first wireless communication mode is used for the forward and reverse communications over assisted wireless link 150 in this example. The same second wireless communication mode is used for the forward and reverse communications over transport wireless link 151 in this example. Transport wireless communication device 110 may include separate transceiver portions for each wireless communication mode, although other configurations could be employed. The reverse communications as received by transport wireless communication device 110 over assisted wireless link 150 may include user communication portions and overhead communication portions. Upon receipt of the reverse communications in transport wireless communication device 110, the overhead communication portions could be separated from the user communication portions, and the user communication portions transferred over transport wireless link 151. Additional overhead communication portions may also be included with the user communication portions of the reverse communications transferred over transport wireless link 151, such as overhead and control information used for the associated wireless communication mode.

Figure 3:
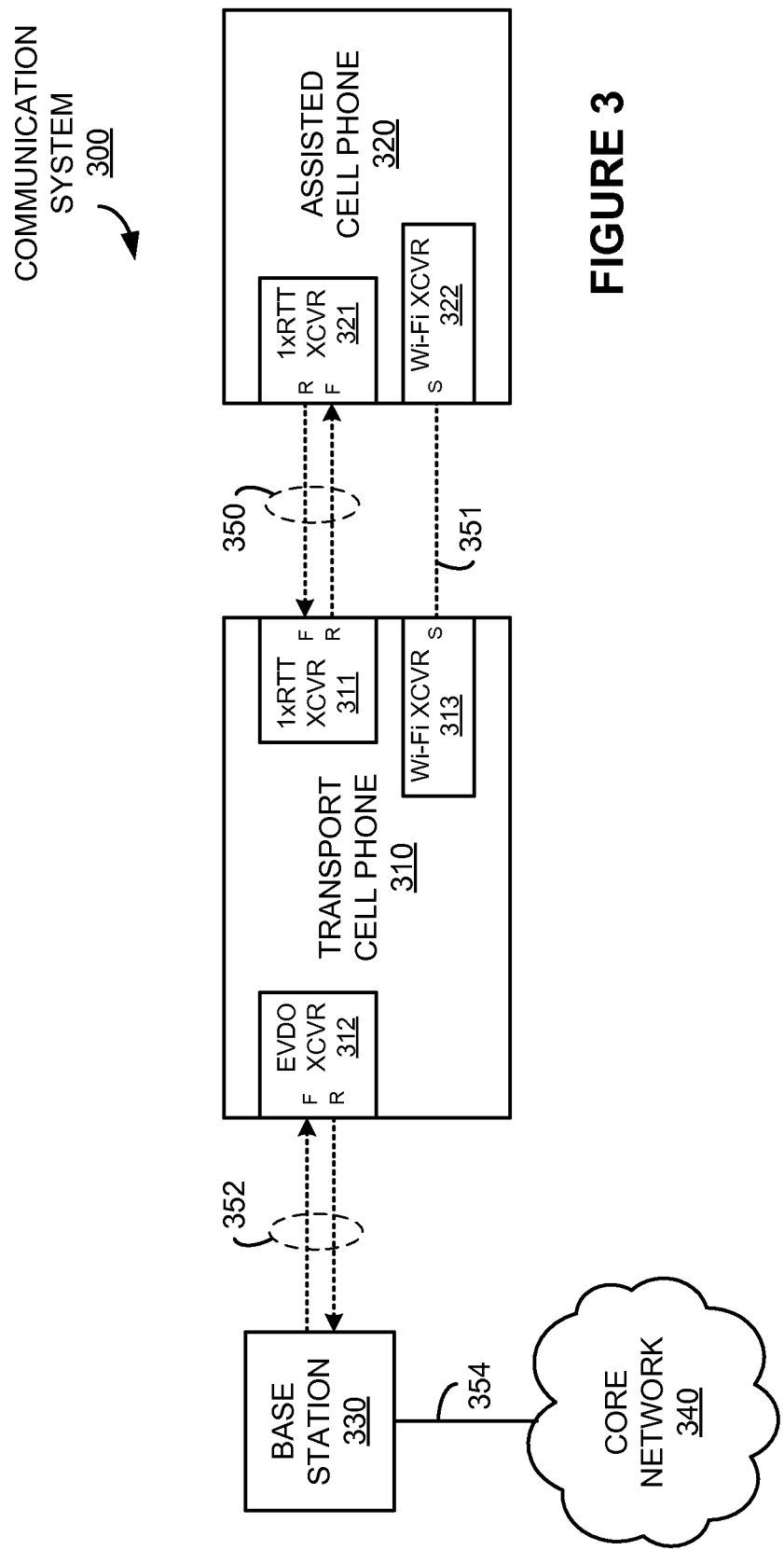
FIG. 3 is a system diagram illustrating a communication system.

FIG. 3 is a system diagram illustrating communication system 300. Communication system 300 includes transport cell phone 310, assisted cell phone 320, base station 330, and core network 340. Base station 330 and core network 340 communicate over backhaul link 354. In this example, backhaul link 354 is a T1 communication link. Base station 330 provides wireless access to the communication services of core network 340, where base station 330 provides wireless access using an Evolution Data Optimized (EVDO) wireless communication protocol and frequency spectrum, although other or additional wireless communication modes could be employed. Core network 330 is a core network of a wireless communications service provider, an could include further base stations, as well as routers, gateways, authentication equipment, and other communication systems to provide communication services to wireless communication device users.

Transport cell phone 310 is a mobile multi-mode cellular telephone capable of communicating over a single-carrier radio transmission technology (1xRTT) wireless link, an EVDO wireless link, and an IEEE 802.11 (Wi-Fi) wireless link, employing the associated wireless communication protocols and wireless communication modes for each wireless link. Assisted cell phone 320 is a mobile cellular telephone in this example, capable of communicating over a 1xRTT wireless link and a Wi-Fi wireless link, employing the associated wireless communication protocols and wireless communication modes for each wireless link. Transport cell phone 310 and assisted cell phone 320 can communicate over assisted wireless link 350 and over sideband link 351. In this example, assisted wireless link 350 is a 1xRTT link provided between 1xRTT transceiver (XCVR) 311 of transport cell phone 310 and 1xRTT transceiver 321 of assisted cell phone 320. Sideband link 351 is a Wi-Fi link provided between Wi-Fi transceiver 313 of transport cell phone 310 and Wi-Fi transceiver 322 of assisted cell phone 320. Transport cell phone 310 and base station 330 can communicate over transport wireless link 352. In this example, transport wireless link 352 is an EVDO link provided between EVDO transceiver 312 of transport cell phone 310 and base station 330.

Figure 4:
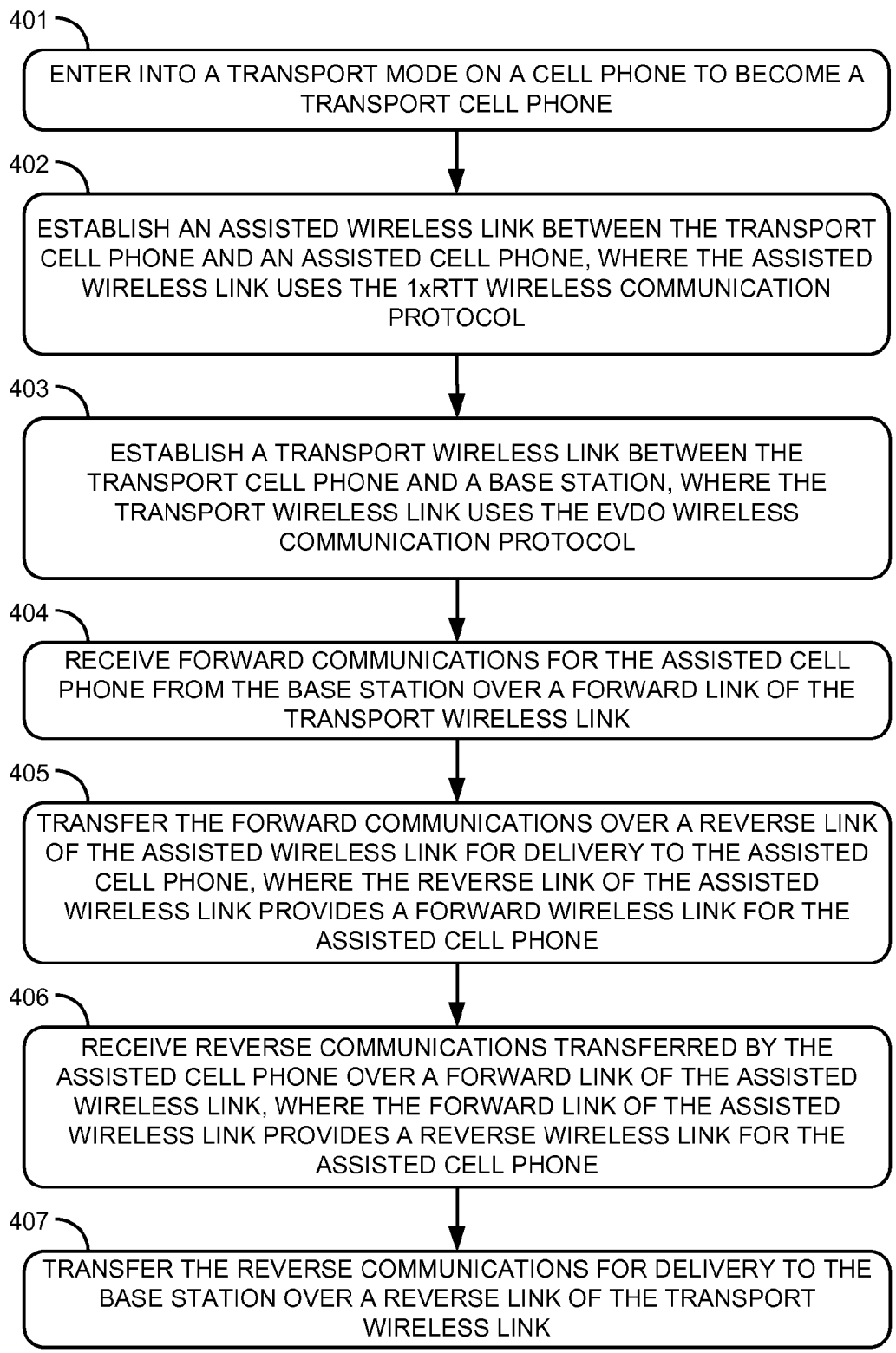
FIG. 4 is a flow diagram illustrating a method of operation of a wireless communication device.

FIG. 4 is a flow diagram illustrating a method of operation of a wireless communication device, such as transport cell phone 310 of FIG. 3. The operations of FIG. 4 are referenced herein parenthetically. In FIG. 4, cell phone 310 enters (401) into a transport mode to become a transport cell phone. The transport mode includes a mode of operation of transport cell phone 310 which enables the transport of the communications of another cell phone through transport cell phone 310. The transport mode could be initiated by a user of transport cell phone 310, such as by starting an application, pushing a button, or otherwise interacting with a user interface of transport cell phone 310, among other operations. In some examples, when transport cell phone 310 is in the transport mode, wireless communications for a user of transport cell phone 310 are disabled and the wireless communication resources of transport cell phone 310 are applied to the operations of the transport mode, although other configurations could be employed. In further examples, a transport mode could refer to a repeater mode, assistant mode, master-slave mode, or other designations.

Transport cell phone 310 establishes (402) assisted wireless link 350 between transport cell phone 310 and assisted cell phone 320. In this example, the wireless communication mode of assisted wireless link 350 uses the 1xRTT wireless communication protocol. Assisted wireless link 350 includes a forward link portion, designated by the letter "F" and a reverse link portion designated by the letter "R" in FIG. 3, from the perspective of 1xRTT transceiver 311 of transport cell phone 310. The forward link portion of assisted wireless link 350 is provided by 1xRTT transceiver 311 of transport cell phone 310 as a reverse link for 1xRTT transceiver 321 of assisted cell phone 320. The reverse link portion of assisted wireless link 350 is provided by 1xRTT transceiver 311 of transport cell phone 310 as a forward link for 1xRTT transceiver 321 of assisted cell phone 320.

To establish assisted wireless link 350, Wi-Fi transceiver 313 of transport cell phone 310 communicates with Wi-Fi transceiver 322 of assisted cell phone 320 over a sideband link, namely Wi-Fi link 351, designated by the letter "S" in FIG. 3. Overhead information, such as registration/authentication information, control information, timing information, channel assignments, frequency assignments, timeslot assignments, or other overhead information, is exchanged over Wi-Fi link 351 to establish assisted wireless link 350. This overhead information could include similar communications as overhead communications used in establishing a 1xRTT wireless link between a wireless communication device and a base station, but exchanged over a sideband link, namely Wi-Fi link 351 in this example. Although in this example sideband link 351 is an IEEE 802.11 Wi-Fi link provided between Wi-Fi transceiver 313 of transport cell phone 310 and Wi-Fi transceiver 322 of assisted cell phone 320, in other examples sideband link 351 could comprise an IEEE 802.15 Bluetooth link provided by Bluetooth transceiver circuitry, a wired or optical universal serial bus (USB) link provided by USB transceiver equipment, a wired RS-232 link, an infrared (IR) light-based link, an optical networking link, or other local area networking or personal area networking communication and signaling links, including variations, combinations, and improvements thereof. In further examples, sideband link 351 could be provided over wireless link 350, or a portion thereof. In yet further examples, transport cell phone 310 and assisted cell phone 320 perform a handshaking operation over sideband link 351 to establish, authenticate, or register assisted cell phone 320 or assisted wireless link 350. This handshaking operation could include a negotiation process to establish channel, frequency, timeslot, or spreading code assignments for use between assisted cell phone 320 and transport cell phone 310 over assisted wireless link 350. In even further examples, handoff signaling could be exchanged between transport cell phone 310 and assisted cell phone 320 to handoff wireless access for assisted cell phone 320 from a wireless access node to transport cell phone 310.

Transport cell phone 310 establishes (403) transport wireless link 352 between transport cell phone 310 and base station 330. In this example, the communication mode of transport wireless link 352 uses the EVDO wireless communication protocol. Transport wireless link 352 includes a forward link portion, designated by the letter "F" and a reverse link portion designated by the letter "R" in FIG. 3, from the perspective of EVDO transceiver 312 of transport cell phone 310. To establish transport wireless link 352, transport cell phone 310 communicates with base station 330 over portions of transport wireless link 352. Overhead information, such as control information, timing information, channel assignments, frequency assignments, timeslot assignments, handoff information, registration/authentication information, or other overhead information, is exchanged over overhead communication portions of transport wireless link 352 to establish transport wireless link 352.

Transport cell phone 310 receives (404) forward communications for assisted wireless cell phone 320 from base station 330 over a forward link of transport wireless link 352. In this example, communications intended for delivery to assisted cell phone 320 from base station 330 are transferred by base station 330 over the forward link of transport wireless link 352. EVDO transceiver 312 of transport cell phone 310 receives the communications that are for delivery to assisted cell phone 320 over the forward link of transport wireless link 352.

Transport cell phone 310 transfers (405) the forward communications for assisted wireless cell phone 320 over a reverse link of assisted wireless link 350 for delivery to assisted cell phone 320. As discussed above, the reverse link of assisted wireless link 350, from the perspective of transport cell phone 310, is provided as a forward link for assisted cell phone 320. 1xRTT transceiver 321 of assisted cell phone 320 then receives the forward communications over the reverse link of assisted wireless link 350, as transferred by 1xRTT transceiver 311 of transport cell phone 310. In some examples, the forward communications as received in transport cell phone 310 over transport link 352 may include user communications as well as overhead communication portions, such as headers, channelization information, addressing, packet header information, packet ordering information, device identifiers, link identifiers, or destination identifiers, among other overhead information. Transport cell phone 310 may remove portions of the overhead communications from the user communication portions before transfer over assisted wireless link 350 for receipt by assisted cell phone 320. For example, overhead information related to the operation and transport of data over transport wireless link 352 may be removed from the user communication portions, and different overhead information related to the operation and transport of data over assisted wireless link 350 may be added to the user communication portions. The user communication portions could include packets, datagrams, or other data structures, and may comprise voice calls, paging information, text messages, data transfers, web pages, Internet data, picture data, voicemail data, or other user communications.

Transport cell phone 310 receives (406) reverse communications transferred by assisted cell phone 320 over a forward link of assisted wireless link 350. As discussed above, the forward link of assisted wireless link 350, from the perspective of transport cell phone 310, is provided as a reverse link for assisted cell phone 320. 1xRTT transceiver 311 of transport cell phone 310 then receives the reverse communications over the forward link of assisted wireless link 350, as transferred by 1xRTT transceiver 321 of assisted cell phone 320.

Transport cell phone 310 transfers (407) the reverse communications for delivery to base station 330 over a reverse link of transport wireless link 352. In this example, communications intended for delivery to base station 330 from assisted cell phone 320 are transferred by transport cell phone 310 over the reverse link of transport wireless link 352. EVDO transceiver 312 of transport cell phone 310 transfers the communications intended for delivery to base station 330 over the reverse link of transport wireless link 352. As discussed above in operation 405, overhead communications could be removed and/or added to the user communication portions of the reverse communications received from assisted cell phone 320 before transfer over transport wireless link 352. It should be understood that communication exchange could occur simultaneously or concurrently over each of wireless links 350-352.

In this example, assisted wireless link 350 is a wireless link provided using a wireless communication mode which uses the 1xRTT wireless communication protocol. This wireless communication mode could also include a frequency spectrum associated with the 1xRTT wireless communication protocol, along with other frequency, timeslot, or spreading code assignments according to the 1xRTT wireless communication protocol. Also, in this example, transport wireless link 352 is a wireless link provided using a wireless communication mode which uses the EVDO wireless communication protocol. This wireless communication mode could also include a frequency spectrum associated with the EVDO wireless communication protocol, along with other frequency, timeslot, or spreading code assignments according to the EVDO wireless communication protocol. As shown for transport cell phone 310 in FIG. 3, separate transceiver portions are used for each of assisted wireless link 350 and transport wireless link 352. In other examples, these transceiver portions could share some circuitry or antenna elements with each other, or comprise the same circuitry and antenna portions.

As discussed above, assisted wireless link 350, as provided by transport cell phone 310 in this example, is provided as a 1xRTT wireless link. Transport wireless link 352 is also provided by base station 330 as an EVDO wireless link. However, other wireless protocols and modes could be employed, such as discussed herein for wireless links 150-151. Transport wireless link 352 and assisted wireless link 350 each typically comprise a wireless protocol used to provide mobile wireless communication services to wireless communication devices, such as provided to cellular telephones via a network of geographically distributed cellular base stations, and not local area network (LAN) or personal area network (PAN) links such as Wi-Fi, Bluetooth, or similar wireless communication protocols. Advantageously, an assisted wireless communication device, such as a cell phone, can utilize transceiver circuitry normally used for communicating with a wireless access node, such as a base station, to instead communicate with a transport wireless communication device.

To provide assisted wireless link 350, transport cell phone 310 may register or authenticate assisted cell phone 320. Transport cell phone 310 itself could register assisted cell phone 320, based upon credentials or registration information stored within transport cell phone 310, or as provided by a user of transport cell phone 310. Transport cell phone 310 could receive authentication or registration information from assisted cell phone 320, such as over sideband link 351, and transfer the authentication or registration information to base station 330. Base station 330 could then authenticate or register assisted cell phone 320, or pass the authentication or registration information to other authentication or registration systems associated with core network 330, such as authentication, authorization and accounting (AAA) systems, among other equipment and systems. In some examples, transport cell phone 310 emulates the operation of a base station to provide assisted wireless link 350 to assisted cell phone 320. In this emulation, transport cell phone 310 could provide a pilot signal, beacon signal, or other signaling for assisted cell phone 320 to discover or handoff to transport cell phone 310. In further examples, transport cell phone 310 could function as a master device and assisted cell phone 320 could function as a slave device. In yet further examples, transport cell phone 310 could function as a repeater device for assisted cell phone 320.

Figure 5:
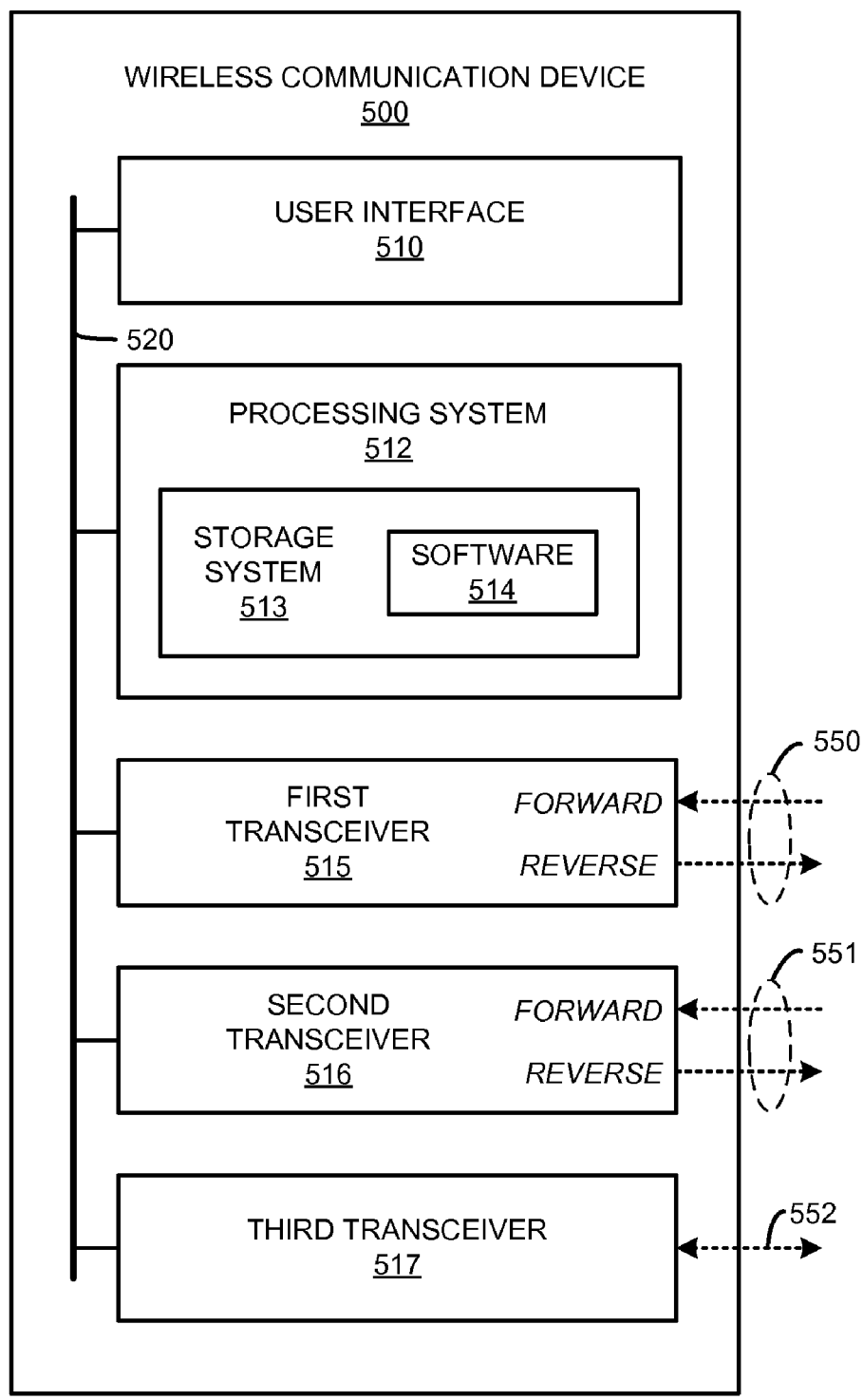
FIG. 5 is a block diagram illustrating a wireless communication device.

FIG. 5 is a block diagram illustrating wireless communication device 500, as an example of transport wireless communication device 110 found in FIG. 1 or transport cell phone 310 found in FIG. 3, although transport wireless communication device 110 and transport cell phone 310 could use other configurations. Assisted wireless communication device 120 or assisted cell phone 320 may include similar elements as wireless communication device 500. Wireless communication device 500 includes user interface 510, processing system 512, first transceiver 515, second transceiver 516, and third transceiver 517. User interface 510, processing system 512, first transceiver 515, second transceiver 516, and third transceiver 517 communicate over bus 520. Wireless communication device 500 may be distributed or consolidated among equipment or circuitry that together form elements 510, 512-517, and 520.

User interface 510 includes equipment and circuitry for receiving user input and control, such as for engaging in voice calls, data sessions, or entering into a transport mode, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 510 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Processing system 512 includes storage system 513. Processing system 512 retrieves and executes software 514 from storage system 513. Processing system 512 could incorporate a computer microprocessor, logic circuit, or some other processing device, and may be distributed among multiple processing devices. Storage system 513 could include computer-readable media such as disks, tapes, integrated circuits, servers, or some other memory device, and also may be distributed among multiple memory devices. Software 514 may include an operating system, logs, utilities, drivers, networking software, and other software typically loaded onto a computer system. Software 514 could contain an application program, firmware, or some other form of computer-readable processing instructions. When executed by processing system 512, software 514 directs wireless communication device 500 to operate as described herein, such as control the operations of user interface 510, first transceiver 515, second transceiver 516, or third transceiver 517, enter into a transport mode, and transport communications received over a first wireless link over a second wireless link, among other operations.

First transceiver 515, second transceiver 516, and third transceiver 517 each comprise radio frequency (RF) communication circuitry and an antenna. Although first transceiver 515, second transceiver 516, and third transceiver 517 each include an antenna in this example, in other examples an antenna could be shared between ones of first transceiver 515, second transceiver 516, and third transceiver 517. First transceiver 515, second transceiver 516, and third transceiver 517 could also each include amplifiers, filters, modulators, and signal processing circuitry. In this example, first transceiver 515, second transceiver 516, and third transceiver 517 can each exchange instructions and information with processing system 512 over bus 520. First transceiver 515, second transceiver 516, and third transceiver 517 also each communicate with other wireless systems or wireless communication devices, omitted for clarity, through the associated antennas and over wireless link 550, 551, and 552, respectively, to access communication services and exchange communications of the communication services, transport communications of an assisted wireless communication device, provide wireless access over a wireless link for an assisted wireless communication device, communicate using forward, reverse, or sideband communication links, tune to different wireless frequency spectrums, or operate in different wireless communication modes, among other operations. In this example, first transceiver 515 and second transceiver 516 comprise wireless cellular communication transceiver equipment, and third transceiver 517 comprises local-area network or personal-area network transceiver equipment, although other configurations could be employed.

Wireless links 550-551 could each use various protocols or communication formats as described herein for wireless links 150-151, 350 and 352, including combinations, variations, or improvements thereof. Wireless link 552 could use various protocols or communication formats as described herein for wireless link 351, including combinations, variations, or improvements thereof. FIG. 5 shows wireless links 550-551 as each including a forward and a reverse link portion. In this example, the forward link portion is used for receiving communications, and the reverse link portion is used for transferring communications. In other examples, different representations of forward links and reverse links could be employed.

Bus 520 comprises a physical, logical, or virtual communication link, capable of communicating data, control signals, communications, and power, along with other information and signals. In some examples, bus 520 is encapsulated within any of elements 510 and 512-517, and may be a software or logical link. In other examples, bus 520 uses various communication media, such as air, space, metal, optical fiber, or some other signal propagation path, including combinations thereof. Bus 520 could be a direct link or might include various equipment, intermediate components, systems, and networks.

Referring back to FIG. 1, wireless communication devices 110 and 120 each comprise radio frequency (RF) communication circuitry and antenna elements. The RF communication circuitry typically includes amplifiers, filters, modulators, and signal processing circuitry. In many examples, wireless communication devices 110 and 120 each include circuitry and equipment to exchange communications of wireless communication services over wireless links, request communication services, and exchange control information for wireless access, among other operations. Wireless communication devices 110 and 120 may also each include user interface systems, memory devices, computer-readable storage mediums, software, processing circuitry, or other communication components. Each of wireless communication devices 110 and 120 may be a user device, subscriber equipment, customer equipment, access terminal, cellular telephone, mobile wireless telephone, computer, e-book, mobile Internet appliance, wireless network interface card, media player, game console, or some other wireless communication apparatus, including combinations thereof.

Wireless access node 130 comprises RF communication and control circuitry, antenna elements, and communication routing equipment and systems. The RF communication circuitry typically includes amplifiers, filters, RF modulators, transceivers, and signal processing circuitry. In many examples, wireless access node 130 includes equipment to provide wireless access to communication services within a coverage area to wireless communication devices, route user communications between core network 140 and wireless communication devices, participate in handoffs of wireless communication devices to other wireless access nodes, among other operations. Wireless access node 130 may also comprise data modems, routers, servers, memory devices, software, processing systems, cabling, network communication interfaces, physical structural supports, or other communication apparatuses. Wireless access node 130 may also comprise base stations, base transceiver stations (BTS), base station controllers (BSC), or other communication equipment and apparatuses.

Core network 140 could include further wireless access nodes, base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other communication systems, including combinations thereof. Core network 140 may also comprise optical networks, asynchronous transfer mode (ATM) networks, packet networks, metropolitan-area networks (MAN), Internet systems, or other network topologies, equipment, or systems, including combinations thereof. In typical examples, core network 140 includes many wireless access systems and associated equipment for providing communication services to many user devices across a geographic region.

Wireless links 150-151 each use the air or space as the transport media. Wireless links 150-151 may each use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), High Speed Packet Access (HSPA), Radio Link Protocol (RLP), or some other wireless communication format, including combinations, improvements, or variations thereof. Although two wireless links 150-151 are shown in FIG. 1, it should be understood that each wireless link is merely illustrative to show communications associated with transport wireless communication device 110.

Communication link 152 uses metal, glass, optical, air, space, or some other material as the transport media. Communication link 152 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 152 could be a direct link or may include intermediate networks, systems, or devices.

Links 151-152 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, the method comprising:
   establishing an assisted wireless link between the wireless communication device and an assisted wireless communication device by at least exchanging overhead communications over a setup communication link to establish the assisted wireless link, wherein the assisted wireless link comprises a first wireless communication mode that requires tuning to a first frequency spectrum and wherein the setup communication link comprises a third wireless communication mode that requires tuning to a third frequency spectrum;
   establishing a transport wireless link between the wireless communication device and a wireless access node, wherein the transport wireless link comprises a second wireless communication mode that requires tuning to a second frequency spectrum;
   receiving forward communications for the assisted wireless communication device from the wireless access node over the transport wireless link;
   transferring the forward communications over the assisted wireless link for receipt by the assisted wireless communication device;
   receiving reverse communications transferred by the assisted wireless communication device over the assisted wireless link; and
   transferring the reverse communications for receipt by the wireless access node over the transport wireless link.

2. The method of claim 1, wherein receiving the forward communications for the assisted wireless communication device from the wireless access node over the transport wireless link comprises receiving the forward communications over a forward link portion of the transport wireless link.

3. The method of claim 1, wherein the assisted wireless link comprises a forward link portion and a reverse link portion to communicate with further wireless access nodes, and wherein transferring the forward communications over the assisted wireless link for receipt by the assisted wireless communication device comprises transferring the forward communications over the reverse link portion of the assisted wireless link.

4. The method of claim 1, wherein the assisted wireless link comprises a forward link portion and a reverse link portion to communicate with further wireless access nodes, and wherein receiving the reverse communications transferred by the assisted wireless communication device over the assisted wireless link comprises receiving the reverse communications over the forward link portion of the assisted wireless link.

5. The method of claim 1, wherein transferring the reverse communications for receipt by the wireless access node over the transport wireless link comprises transferring the reverse communications over a reverse link portion of the transport wireless link.

6. The method of claim 1, wherein the first wireless communication mode comprises single-carrier radio transmission technology link (1xRTT) wireless communication protocol, and wherein the second wireless communication mode comprises Evolution Data Optimized (EVDO) wireless communication protocol.

7. The method of claim 1, wherein the first wireless communication mode comprises single-carrier radio transmission technology link (1xRTT) wireless communication protocol, and wherein the second wireless communication mode comprises Worldwide Interoperability for Microwave Access (WiMAX) wireless communication protocol.

8. A wireless communication device, comprising:
- a first transceiver configured to establish an assisted wireless link between the wireless communication device and an assisted wireless communication device, wherein the assisted wireless link comprises a first wireless communication mode that requires tuning to a first frequency spectrum;
- a second transceiver configured to establish a transport wireless link between the wireless communication device and a wireless access node, wherein the transport wireless link comprises a second wireless communication mode that requires tuning to a second frequency spectrum;
- a third transceiver configured to exchange overhead communications over a third communication link to establish the assisted wireless link, wherein the third communication link comprises a third wireless communication mode that requires tuning to a third frequency spectrum;
- the second transceiver configured to receive forward communications for the assisted wireless communication device from the wireless access node over the transport wireless link;
- the first transceiver configured to transfer the forward communications over the assisted wireless link for receipt by the assisted wireless communication device, and receive reverse communications transferred by the assisted wireless communication device over the assisted wireless link; and
- the second transceiver configured to transfer the reverse communications for receipt by the wireless access node over the transport wireless link.

9. The wireless communication device of claim 8, wherein the second transceiver is configured to receive the forward communications for the assisted wireless communication device from the wireless access node over a forward link portion of the transport wireless link.

10. The wireless communication device of claim 8, wherein the assisted wireless link comprises a forward link portion and a reverse link portion to communicate with further wireless access nodes, and wherein the first transceiver is configured to transfer the forward communications over the reverse link portion of the assisted wireless link for receipt by the assisted wireless communication device.

11. The wireless communication device of claim 8, wherein the assisted wireless link comprises a forward link portion and a reverse link portion to communicate with further wireless access nodes, and wherein the first transceiver is configured to receive the reverse communications transferred by the assisted wireless communication device over the forward link portion of the assisted wireless link.

12. The wireless communication device of claim 8, wherein the second transceiver is configured to transfer the reverse communications for receipt by the wireless access node over a reverse link portion of the transport wireless link.

13. The wireless communication device of claim 8, wherein the first wireless communication mode comprises single-carrier radio transmission technology link (1xRTT) wireless communication protocol, and wherein the second wireless communication mode comprises Evolution Data Optimized (EVDO) wireless communication protocol.

14. The wireless communication device of claim 8, wherein the first wireless communication mode comprises single-carrier radio transmission technology link (1xRTT) wireless communication protocol, and wherein the second wireless communication mode comprises Worldwide Interoperability for Microwave Access (WiMAX) wireless communication protocol.

15. A method of operating a wireless communication device, the method comprising:
- entering into a transport mode on the wireless communication device;
- in response to entering the transport mode, establishing an assisted wireless link between the wireless communication device and an assisted wireless communication device by exchanging overhead communications over a setup communication link between the wireless communication device and the assisted wireless communication device to establish the assisted wireless link, and establishing a transport wireless link between the wireless communication device and a wireless access node, wherein the assisted wireless link uses a first wireless communication protocol and comprises a forward link portion and a reverse link portion to communicate with further wireless access nodes, wherein the transport wireless link uses a second wireless communication protocol, and wherein the setup communication link uses a third wireless communication protocol;
- receiving forward communications for the assisted wireless communication device from the wireless access node over a forward link portion of the transport wireless link;
- transferring the forward communications over the reverse link portion of the assisted wireless link for receipt by the assisted wireless communication device;
- receiving reverse communications transferred by the assisted wireless communication device over the forward link portion of the assisted wireless link; and
- transferring the reverse communications for receipt by the wireless access node over a reverse link portion of the transport wireless link.

16. The method of claim 15, wherein the first wireless communication protocol comprises single-carrier radio transmission technology link (1xRTT) wireless communication protocol, and wherein the second wireless communication protocol comprises Evolution Data Optimized (EVDO) wireless communication protocol.

* * * * *